Figure 1:
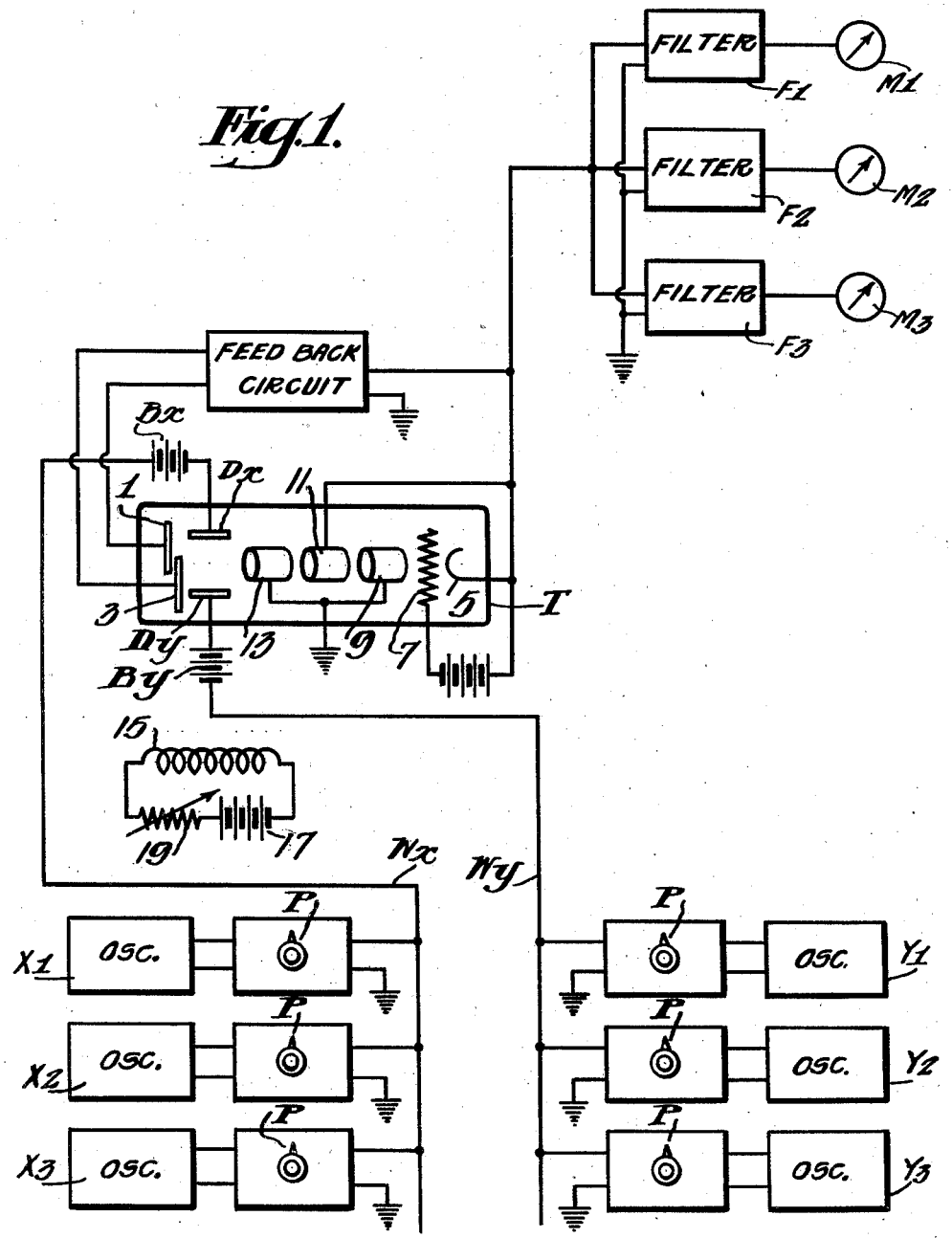

Dec. 23, 1947.  J. A. RAJCHMAN ET AL  2,433,236
ELECTRONIC COMPUTING DEVICE
Filed Nov. 29, 1941  2 Sheets-Sheet 1

Inventors
Jan A. Rajchman
& Richard L. Snyder, Jr.
By
Attorney

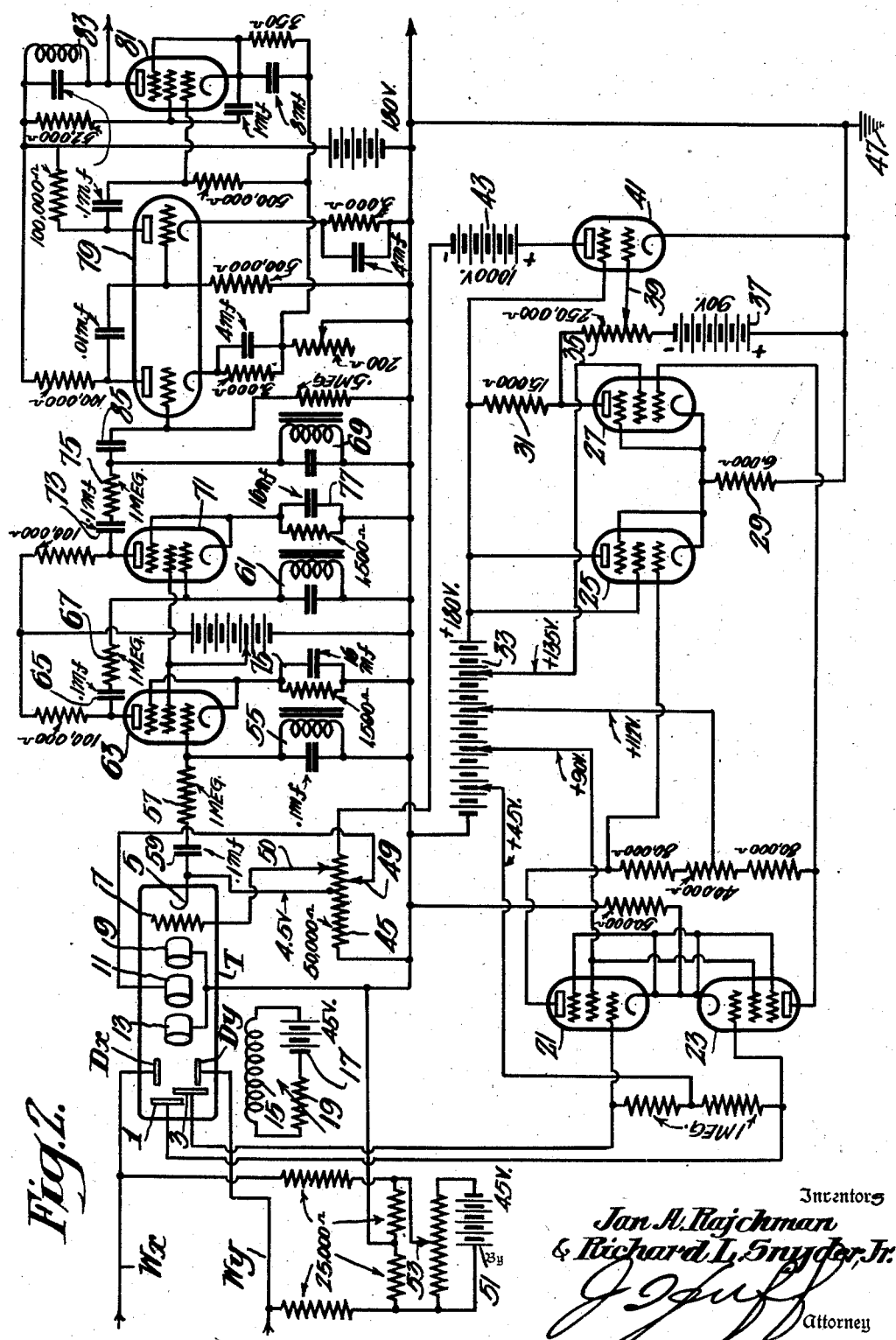

Patented Dec. 23, 1947

2,433,236

UNITED STATES PATENT OFFICE 2,433,236

ELECTRONIC COMPUTING DEVICE

Jan A. Rajchman, Philadelphia, Pa., and Richard L. Snyder, Jr., Glassboro, N. J., assignors to Radio Corporation of America, a corporation of Delaware Application November 29, 1941, Serial No. 420,950

4 Claims. (Cl. 235—61)

This invention relates to electronic computing devices and has for its principal object to provide a novel and reliable method and means for obtaining substantially instantaneously a voltage which is proportional to the product of two given alternating current voltages.

Another and important object of the present invention is to provide an electronic computing device capable of simultaneously solving several different, or indeed similar, problems in multiplication.

It has been disclosed by Rajchman and Morton in co-pending application Serial No. 408,870, filed August 29, 1941, now abandoned, and replaced by the continuation in part application Serial No. 528,882, filed March 31, 1944, that two electronic squaring devices can be used to multiply, since the difference between the squares of the sum and difference of two numbers is proportional to their product. The present invention discloses a method of multiplication which requires the use of but one squaring device, irrespective of the number of multipliers and multiplicands involved.

The two given A.-C. voltages, of which the product is desired, may be constant or variable. The present disclosure is not especially concerned with the utilization of the said product though it may here be mentioned that the invention finds useful application not only in devices which may be considered as electronic equivalents of conventional mechanical computing machines but also in electro-mechanical control systems for directing anti-aircraft fire, and the like, and wherein computations based on rapidly varying data must, for optimum results, be completed with extreme rapidity.

The principle of the invention, together with other objects and advantages and certain preferred details of construction, will be explained in the following specification with reference to the accompanying drawings, wherein:

Figure 1 is a partly schematic arrangement of an apparatus, within the invention, for obtaining, simultaneously, several electrical values each proportional to the product of two given electrical values, and Figure 2 is a circuit diagram including certain of the aparatus shown schematically in Fig. 1.

When operated in accordance with the method of the invention, the apparatus shown in Fig. 1 provides a voltage, or a number of discrete voltages, proportional to the product of one or more pairs (multiplier and multiplicand) of voltages, $x$ and $y$. The resulting voltage ($xy$) or voltages may be indicated on suitably calibrated meters $M_1$, $M_2$, and $M_3$, and may be otherwise utilized, if desired. The voltages to be multiplied are supplied, in the instant case, by oscillators $X_1$, $Y_1$, $X_2$, $Y_2$, and $X_3$, $Y_3$ which are operated at different fixed frequencies. The amplitude of each of these oscillators $X$ and $Y$ can be varied as by means of separate potentiometers P. Thus, if the apparatus is used in directing anti-aircraft fire, the amplitude of each oscillator may be proportionately varied, manually or automatically, in agreement with the multipliers and multiplicands supplied by suitable position finding instruments (not shown). In this case the circuits incorporating the meters M may serve to control additional, perhaps similar, electronic computing devices (not shown) which in turn may ultimately serve to control the gun and fuse settings.

In accordance with the invention, the amplitude controlled A.-C. outputs of the oscillators X and Y are superimposed upon a D.-C. voltage supplied, in the instant case, by batteries $B_x$ and $B_y$, respectively, and then applied through the leads $W_x$ and $W_y$ to the separate deflecting plates $D_x$ and $D_y$ of a cathode ray beam tube T. This tube T is provided with a bi-part collector electrode, the separate parts 1 and 3 of which preferably overlap and in any event are mounted in closely spaced relation. This tube is also provided with a cathode 5, a grid 7, and a series of beam forming electron lens elements 9, 11, and 13, two (9 and 13) of which may be tied together and considered as a single accelerating electrode. When the tube is properly energized the electrons emanating from the cathode 5 pass through the grid 7, and lens system 9, 11, 13 and are subject to the influence of a constant magnetic field which is applied in a direction perpendicular to the plane defined by electric field and the axis of the beam as by means of a coil or yoke 15 surrounding the tube adjacent the deflecting electrodes $D_x$ and $D_y$. The yoke 15 is here shown energized by a battery 17 having a variable resistor 19 in series therewith.

The application (in addition to the D.-C. voltage supplied by batteries $B_x$ and $B_y$) of the A.-C. voltages from oscillators X and Y to the deflecting plates $D_x$ and $D_y$, respectively, of the tube T produces a slight deflection of the electron beam in the tube and a resulting difference in electron flow to the separate parts 1 and 3 of the bi-part target. A feedback circuit (later described in connection with Fig. 2) connected to the separate parts 1 and 3 of the target produces an amplified "signal" voltage proportional to the difference of the electron flow to the separate parts of the target. This amplified signal voltage is impressed upon the cathode 5 and thus adjusts it to the potential (negative with respect to ground, and the accelerating electrodes 9 and 13) required to prevent deflection of the beam by the electric and magnetic fields present between the deflecting plates D$x$ and D$y$. Electrical filters F$_1$, F$_2$, and F$_3$ connected between the cathode 5 and accelerating electrode 9, 13 are each designed to pass (to the meters M1, M2 and M3, respectively) a frequency component of one of the said signal voltages proportional to either the sum or to the difference of the frequencies ($x$ and $y$) originally applied to the deflecting plates D$x$ and D$y$.

Before proceeding with a detailed description of the feedback circuit shown in Fig. 2, it may be well to explain the principle and theory upon which the present invention is predicated.

It is well known that the deflection $d$ of the electron beam in a cathode ray tube due to an electric field E is $$d = c\frac{E}{V} \quad (1)$$

where V is the voltage through which the electrons have been accelerated before they enter the field E, and $c$ is a constant which depends upon the geometry of the tube. Similarly, for a uniform magnetic field H the deflection is given by $$d = a\frac{H}{\sqrt{V}} \quad (2)$$

where $a$ is a constant which depends upon the geometry of the tube. Should the electric and magnetic fields be other than uniform, then the same relations (1) and (2) still hold and E and H are values of the fields at a particular point, and the constants $a$ and $c$ have appropriate values.

Suppose now that the electric and magnetic fields are in the same physical space and that they tend to deflect the beam in opposite directions. When there is no deflection the trajectory of the beam remains a straight line and it can be made to strike two collecting plates separated by a negligible distance. Thus the currents to the two plates are equal. As soon as there is a slight deflection the currents to the two plates become unequal, and their difference may be considered as a signal. This signal may be used to control the value of the accelerating voltage V in such a way as to keep the beam undeflected for any arbitrarily chosen values of E and H. We will have then $$c\frac{E}{V} = a\frac{H}{\sqrt{V}} \quad (3)$$

or $$E^2 = \lambda^2 H^2 V \quad (4)$$

If the magnetic field is maintained constant, the relation between E and V according to (4) becomes simply $$kE^2 = V \quad (5)$$

This Equation 5 shows that a deflection tube with electrostatic and magnetic deflection may be employed as a squaring device. It has already been shown (in copending application Ser. No. 408,870, filed August 29, 1941, to Rajchman and Morton) that two squaring devices can be made to multiply, since the difference between the squares of the sum and difference of two numbers is proportional to their product. However, a deflection tube similar to that shown in Figs. 1 and 2 lends itself to a method of multiplication requiring but one squaring element, instead of two. In accordance with the present invention the electric deflection field is made to be:

$$E = x \sin \omega_1 t + y \sin \omega_2 t \quad (6)$$

Substituting this in Equation 5

$$V = k(x \sin \omega_1 t + y \sin \omega_2 t)^2 =$$

$$k(x^2 \sin^2 \omega_1 t + y^2 \sin^2 \omega_2 t + 2xy \sin \omega_1 \sin \omega_2 t) \quad (7)$$

$$V = k\left\{\frac{x^2 1 - \cos 2\omega_1 t}{2} + \frac{y^2 1 - \cos 2\omega_2 t}{2} + xy[\cos(\omega_1 - \omega_2) - \cos(\omega_1 + \omega_2)]\right\} \quad (8)$$

In other words, the voltage V will have constant terms, terms of frequency $2\omega_1$ and $2\omega_2$ and terms of frequency $(\omega_1 - \omega_2)$ or $(\omega_1 + \omega_2)$. It will be noted that the terms of frequency $(\omega_1 - \omega_2)$ or $(\omega_1 + \omega_2)$ have an amplitude which is proportional to the unknown product $xy$. Therefore if an appropriate band pass filter is used in the circuit of V which passes only frequencies neighboring $(\omega_1 - \omega_2)$ or $(\omega_1 + \omega_2)$, the output of this filter will be proportional to the product of the given amplitudes $x$ and $y$.

As indicated in Fig. 1 the device of the invention is capable of performing several multiplications simultaneously. In this case let E be equal to:

$$E = a_1 \sin \omega_1 t + a_2 \sin \omega_2 t +$$
$$a_3 \sin \omega_3 t + \ldots a_n \sin \omega_n t \quad (9)$$

then, by substitution in Equation 5:

$$V = k\sum_{i=1}^{i=n} a_i^2 \sin^2 \omega_i t + 2k\sum_{i=1}^{i=n}\sum_{\substack{\lambda=1 \\ \lambda \neq \lambda}}^{\lambda=n} a_i a_\lambda \sin \omega_i t \sin \omega_\lambda t \quad (10)$$

All the terms of the first sum given constant terms or terms whose frequencies are $2\omega_1$. Every term of the second double sum can be expressed in terms of two terms of frequencies $\omega_i - \omega_\lambda$ and $\omega_i + \omega_\lambda$, respectively. The amplitude of the term $(i, \lambda)$ is $a_i a_\lambda$. Therefore if a series of filters (F Fig. 1) tuned to the frequencies $\omega_i - \omega_\lambda$ (or $\omega_i + \omega_\lambda$) are inserted in the circuit of V they will pass amplitudes proportional, respectively, to $a_i a_\lambda$. Thus, it is possible to multiply simultaneously any two of the $n$ coefficients $a_1$ to $a_n$ one by another.

It may be noted also that one of the frequencies used can be zero. In this case the resultant A.-C. amplitude will be proportional to a D.-C. voltage and to an A.-C. voltage, as shown by:

$$V = k(x + y \sin \omega t)^2 = x^2 + y^2 \sin \omega t + 2xy \sin \omega t$$
$$= x^2 + \frac{y^2}{2}(1 - \cos 2\omega t) + 2xy \sin \omega t \quad (11)$$

Attention is also called to the fact that the energy required to drive the electrostatic deflecting plates is very small as compared to that which would be necessary if the magnetic field were to vary at the same rapid rate of change. Thus the fact that the magnetic field remains constant renders the device of the invention practical.

From the foregoing it will be apparent that the operation of the device necessarily requires the use of circuit means which will automatically so adjust the accelerating voltage V that the electron beam will be instantly restored to its normal straight or undeflected path for all combinations of the magnetic (H) and electric (E) fields, however rapid the variations of the latter field. One form of feedback circuit which will perform this adjustment is shown in detail in Fig. 2.

The deflection tube T of Fig. 2 is essentially the same as the similarly designated tube of Fig. 1. That is to say it employs the same arrangement of electrodes and requires the use of but a single accelerating voltage so that its focus depends essentially upon its geometry and remains the same substantially irrespective of the particular value of the said accelerating voltage. In practice, however, it was found desirable to adjust the potential of the middle lens element 11 (which is shown in Fig. 1 at cathode potential) to a potential slightly negative with respect to the cathode. The grid bias and the control of the accelerating voltage are effected in this embodiment of the invention, by means of a feedback circuit from the collector plates 1, 3 to the cathode 5.

The feedback circuit shown in Fig. 2 comprises a push-pull amplifying stage consisting of two pentode (type 6K6) tubes, here designated 21 and 23, respectively, working into two similar tubes 25 and 27 for converting the push-pull signal into a linear signal. This conversion is necessary in the absence of any provision for maintaining a constant current in the beam of the deflection tube T. Such conversion ensures that the difference and not the absolute value of the currents striking the separate parts 1 and 3 of the bi-part collector will operate the feedback network. A "cathode follower circuit" is utilized for the conversion, in the following manner. The signal from half the push-pull circuit, say from tube 21 is fed into the grid of the pentode 25. This tube 25 handles fairly heavy currents (say 10 to 15 ma.), its plate and screen are maintained at a fixed potential. The signal from the other tube 23 of the first push-pull stage drives the grid of another pentode 27 carrying a much smaller current (say 2 ma.) whose cathode is connected to the cathode of the heavy current tube 25. A large resistance 29 connects the cathodes of both tubes 25 and 27 to ground. In this arrangement the potential of the cathode in the heavy current tube 25 follows the grid potential from one side (21) of the push-pull stage (21—23) hence the potential of the cathode of the low current tube 27 also follows the said grid potential. The grid of the low current tube 27, being driven by the other side (23) of the first push-pull circuit (21—23) changes its potential in the opposite direction from its cathode. The plate of the low current tube 27 is connected through a resistor 31 to the plate supply 33. The output of this tube 27 is fed into a voltage divider 35 which is connected to the plate of the low current tube 27 and to a source of potential 37, say 90 volts negative with respect to ground. An arm 39 of the voltage divider 35 is connected to the grid of a high current (type 807) tube 41 which controls the potential of the cathode 5 of the deflection tube T, through a 1000-volt battery 43 and a voltage divider 45. The negative return of the battery 43 is connected to the voltage divider 45 whose other terminal is grounded at 47, closing the anode circuit of tube 41. The appropriate potential for the middle electrode 11 of the electron gun is obtained through arms 49 and 50, respectively, on the voltage divider 45. Since the electrodes 5, 7 and 11 are all connected to the same voltage divider 45 the ratios of their potentials will remain substantially constant irrespective of the voltage impressed upon the divider by tube 41.

The constant magnetic field impressed in the region of the deflecting plates Dx, Dy, is obtained by using an ordinary television deflecting yoke 15 connected to a battery 17 as in Fig. 1. A D.-C. centering potential on the deflecting plates Dx and Dy is supplied from a battery 51 through a potentiometer 53. The A.-C. potentials are derived through leads Wx and Wy as in Fig. 1, from two or more oscillators (not here shown) whose amplitudes are controlled in such a way that they are proportional to the numbers to be multiplied. Where but two input voltages were employed their frequencies were chosen to be 1000 cycles and 1600 cycles and their 600 cycle difference was sufficiently high to substantially eliminate any stray 60 cycle interference from nearby mains. The difference frequency was chosen, in this case, instead of the sum, to make sure that harmonics from either of the input frequencies would not interfere with the output. The filter system used to pass that component of the cathode potential which varies at a frequency neighboring 600 cycles, and whose amplitude represents the desired product (xy), consists, in this case, of a number of simple parallel resonant circuits 55, 61, 69, 83.

As shown in Fig. 2, the first parallel resonant circuit or filter 55 is coupled to the cathode 5 of the tube T through a large resistor 57 and blocking capacitor 59. The second parallel resonant circuit 61 is coupled to the preceding circuit 55 by means of the pentode 63, a blocking capacitor 65 and resistor 67. Similarly, the second parallel resonant circuit 61 is coupled to the third "filter" 69 through a pentode 71, a blocking capacitor 73 and resistor 75. As in standard practice both pentodes 63 and 71 are provided with an automatic cathode-biasing arrangement 75, 77, respectively. Additional amplification and filtering action are provided in this case by a degenerative amplifier comprising a dual-triode 79 (tube type 6F8), a pentode 81 and the fourth parallel resonant circuit 83. This linear amplifying network (79, 81, 83) is shown coupled to the third filter 69 through a blocking capacitor 85; its output is taken from the last parallel resonant circuit or filter 83, as indicated by the arrows.

While in Fig. 1, the A.-C. voltages to be multiplied are shown as derived from separate oscillators (X and Y) whose outputs are controlled either manually or automatically by potentiometers P, it is obvious that the apparatus of the invention can be utilized to multiply two (or more) pairs (multiplier and multiplicand) of A.-C. voltages, however generated or derived. Similarly, and as previously indicated, any form of utilization device or circuit may be substituted for the meters (M) of Fig. 1.

The electrical values and tube types marked on Fig. 2 were those employed in one practical embodiment of the invention, however, the inclusion of this information in this specification is not to be construed in a limiting sense since, obviously, the invention is susceptible of numerous other embodiments within the scope of the appended claims.

What is claimed is:

1. Method of multiplying a multiplier and a multiplicand, said method comprising generating two A.-C. voltages of different frequencies and of amplitudes proportional respectively to said multiplier and multiplicand, generating a stream of electrons of a certain velocity, subjecting said electron stream to crossed electric and magnetic fields of an intensity and direction calculated to direct said stream in a straight path, subjecting said electron stream to an additional electric field of an intensity proportional to the resultant of said two A.-C. voltages whereby said electron stream tends to be deflected, causing the deflection of said stream (resulting from the application of said A.-C. voltages of different frequencies to said crossed magnetic and electric fields) to generate an instantaneous potential, controlling the velocity of said electrons in accordance with said potential in the sense and to the degree required to substantially overcome the tendency of said electron stream to alter its path, and then deriving from said instantaneous potential a component which varies at a frequency which is equal to the sum or to the difference of the frequencies of said multiplier and multiplicand voltages.

2. Method of operating an electron beam tube of the type operable in a magnetic field of constant intensity and containing an electron emissive cathode, an accelerating electrode, a pair of deflecting plates and a bi-part target, said method comprising applying a constant D.-C. voltage between said deflecting plates, superimposing a plurality of A.-C. voltages of different frequencies upon the D.-C. voltage applied between said deflecting plates to produce a deflection of said beam and a resulting difference in electron flow to the separate parts of said bi-part target, producing a signal voltage proportional to the instantaneous difference of the electron flow to said separate parts of said bi-part target, and applying said signal voltage between said cathode and accelerting electrode to change the velocity of said electrons and thereby oppose the deflection effect of said magnetic field and of the electric field between said deflecting electrodes.

3. The invention as set forth in claim 2 and including the additional step of deriving from the instantaneous potential applied to said accelerating electrode a signal component of a frequency equal to the sum or to the difference of the frequencies of the A.-C. voltages applied to said deflecting plates.

4. Apparatus for obtaining an electrical value which is proportional to the product of two given A.-C. voltages of different frequencies, said apparatus comprising, in combination, an electron beam tube containing an electron-emissive cathode, an accelerating electrode, a pair of deflecting electrodes and a bi-part target, means for generating and applying a magnetic field to said beam tube in a direction normal to the plane defined by the axis of said electron beam and the direction of the electric field between said deflecting plates, means for applying said A.-C. voltages to said deflecting plates whereby to produce a deflection of said beam and a resulting difference in electron flow to the separate parts of said bi-part target, means for producing a signal voltage proportional to the difference of the electron flow to said separate parts of said target, means for amplifying said signal voltage, means for applying said amplified signal voltage between the cathode and accelerating electrode of said beam tube in a manner tending to prevent deflection of said beam by said magnetic field and by the voltages applied between said deflecting plates, and an electrical filter connected between said cathode and accelerating electrode and adapted to pass a frequency component of said signal voltage proportional to the sum or difference of the frequencies of the voltages applied to said deflecting plates.

JAN A. RAJCHMAN.
RICHARD L. SNYDER, Jr.